United States Patent Office 3,410,908
Patented Nov. 12, 1968

3,410,908
4-(1-HYDROXY-4-OXO-2,6,6-TRIMETHYL-2-CYCLOHEXENE-1-YL)-3-BUTENE-2-ONE
Ralph Lawrence Rowland and Donald L. Roberts, Winston-Salem, N.C., assignors to R. J. Reynolds Tobacco Company, Winston-Salem, N.C., a corporation of New Jersey
No Drawing. Filed Mar. 14, 1966, Ser. No. 533,839
1 Claim. (Cl. 260—587)

ABSTRACT OF THE DISCLOSURE

The compound, 4-(1-hydroxy-4-oxo-2,6,6-trimethyl-2-cyclohexene-1-yl)-3-butene-2-one is prepared by oxidation of α-ionone.

---

The present invention relates to a new composition of matter and synthesis methods.

The new composition of matter of the present invention is designated chemically as 4-(1-hydroxy-4-oxo-2,6,6-trimethyl-2-cyclohexene-1-yl)-3-butene-2-one and has the following structural formula:

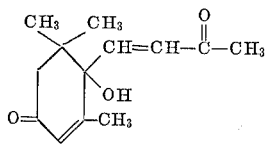

Compound I

For simplicity Compound I can be designated 1-hydroxy-4-keto-α-ionone. This material can be prepared as follows:

Preparation of 4-(1-hydroxy-4-oxo-2,6,6-trimethyl-2-cyclohexene-1-yl)-3-butene-2-one α-Ionone (100 grams 67% α-ionone) in 150 milliliters of benzene was added dropwise to a benzene solution of t-butyl chromate reagent (325 grams of t-butyl alcohol, 163 grams of chromium trioxide, 55 grams of acetic acid and 75 grams of acetic anhydride). The solution was stirred at 25° for 64 hours and then 17 hours at 50° C. Oxalic acid was then added to decompose the excess oxidizing agent. The layers were separated and the aqueous layer was extracted once with benzene. The solution was then dried and chromatographed on silicic acid columns using ether-pentane mixtures as eluents. The chromatography fractions contained 40 grams α- and β-ionone and 5 grams of Compound I, 4-(1-hydroxy-4-oxo-2,6,6-trimethyl-2-cyclohexene-1-yl)-3-butene-2-one having a melting point of 112–113° C. and the following characterization:

Infrared spectrum: 3500, 1667, 1633, 1270, 1127, 1027, 1029, 999, 982, 922, and 887 cm.$^{-1}$.

Nuclear magnetic resonance spectrum: α=3.23 (1, doublet, J=16.2), 3.43 (1, doublet, J=16.2), 3.94 (1), 7.57 (2), 7.70 (3), 8.08 (3), 8.86 (3) and 8.95 (3).

Analysis.—Calcd. for $C_{13}H_{18}O_3$: C, 70.24; H, 8.16. Found: C, 70.35; H, 8.01.

Compound I of this invention finds particular utility in the preparation of the plant abscission hormone, Abscisin II, which chemically is 3-methyl-5-(1-hydroxy-4-oxo-2,6,6-trimethyl-2-cyclohexene-1-yl)-cis,trans-2,4-pentadienoic acid having the following structure:

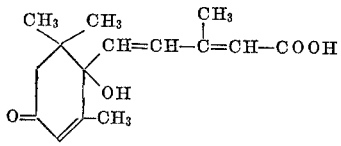

The above plant hormone, Abscisin II, is an abscission-accelerating substance which can be isolated from young cotton fruits and sycamore leaves. Synthetic production of this hormone is obviously desirable and this can readily be accomplished utilizing as the starting material Compound I of the present invention. This synthesis is carried out as follows:

Preparation of ethyl-3-methyl-5-(1-hydroxy-4-oxo-2,6,6-trimethyl-2-cyclohexene-1-yl)-2,4-pentadienoate Triethyl phosphonoacetate (5.7 grams, 0.025 moles) was added dropwise at 20° to a slurry of 56% sodium hydride (1.2 grams, 0.02 moles) in 50 milliliters of dry 1,2-dimethoxyethane. After the addition, the reaction mixture was stirred one hour at room temperature until gas evolution had ceased. The compound 4-(1-hydroxy-4-oxo-2,6,6-trimethyl-2-cyclohexene-1-yl)-3-butene-2-one (5.8 grams, 0.026 mole) in 30 milliliters of 1,2-dimethoxyethane was added dropwise at such a rate that the temperature was maintained below 30°. The reaction was then refluxed for four hours, water was added, and the mixture was extracted with ether. After evaporation of the ether, the residue was chromatographed; the product was eluted from silicic acid with 25% ether-pentane. In addition to the product, one gram of starting material was obtained. The ester was identified by its infrared and nuclear magnetic resonance spectra.

Hydrolysis of ethyl-3-methyl-5-(1-hydroxy-4-oxo-2,6,6-trimethyl-2-cyclohexene-1-yl)-2,4-pentadienoate The title compound was hydrolyzed in 10% sodium hydroxide in 50% aqueous alcohol at room temperature for four hours. The solution was extracted with ether, acidified, and then extracted again with ether. The latter extract was dried and evaporated. The residue was chromatographed on silicic acid using ether-pentane mixtures as eluents. Two hundred and fifty milligrams of 3-methyl-5-(1-hydroxy-4-oxo-2,6,6-trimethyl-2-cyclohexene-1-yl)-cis,trans-2,4-pentadienoic acid, melting point 190–191° C., was obtained and recrystallized from benzene. The acid was shown to be identical with Abscisin II by a comparison of the infrared, ultraviolet and nuclear magnetic resonance spectra.

All temperatures herein are in degrees centigrade.

Those modifications and equivalents which fall within the spirit of the invention and the scope of the appended claim are to be considered part of the invention.

We claim:
1. 4-(1-hydroxy-4-oxo-2,6,6-trimethyl-2-cyclohexene-1-yl)-3-butene-2-one.

References Cited

UNITED STATES PATENTS 3,278,562  10/1966  Thigpen _____ 260—586

OTHER REFERENCES

Hawkins: "Organic Peroxides," p. 165 (1961).

LEON ZITVER, *Primary Examiner.*

M. JACOB, *Assistant Examiner.*